United States Patent
Kim et al.

(10) Patent No.: US 11,506,151 B2
(45) Date of Patent: Nov. 22, 2022

(54) DUAL PURGE EJECTOR AND DUAL PURGE SYSTEM USING THE SAME

(71) Applicant: HYUNDAI KEFICO CORPORATION, Gyeonggi-do (KR)

(72) Inventors: Dong June Kim, Daegu (KR); Chan Karam Na, Seoul (KR)

(73) Assignee: Hyundai Kefico Corporation, Gyeonggi-Do (KR)

( * ) Notice: Subject to any disclaimer, the term of this patent is extended or adjusted under 35 U.S.C. 154(b) by 0 days.

(21) Appl. No.: 17/346,558

(22) Filed: Jun. 14, 2021

(65) Prior Publication Data
US 2021/0388797 A1    Dec. 16, 2021

(30) Foreign Application Priority Data
Jun. 15, 2020  (KR) .......................... 10-2020-0072303

(51) Int. Cl.
*F02M 25/08*   (2006.01)
(52) U.S. Cl.
CPC ............................... *F02M 25/0836* (2013.01)
(58) Field of Classification Search
CPC ............. F02M 25/089; F02M 25/0809; F02M 25/0872; F02M 25/0836
USPC .................................................. 123/518–520
See application file for complete search history.

(56) References Cited

U.S. PATENT DOCUMENTS

| | | | |
|---|---|---|---|
| 10,697,400 B2* | 6/2020 | Kawanishi ......... | F02M 25/0854 |
| 2006/0179928 A1* | 8/2006 | Shikama ............ | F02M 25/0809 |
| | | | 73/114.38 |
| 2019/0048830 A1* | 2/2019 | Akiyama ............... | F02M 25/08 |
| 2019/0234294 A1* | 8/2019 | Sager ................. | F02M 25/0836 |

FOREIGN PATENT DOCUMENTS

| | | |
|---|---|---|
| JP | 2020063688 A | 4/2020 |
| KR | 1020110109378 A | 10/2011 |
| KR | 101902542 B1 | 9/2018 |

* cited by examiner

*Primary Examiner* — Hai H Huynh
(74) *Attorney, Agent, or Firm* — Fox Rothschild LLP

(57) ABSTRACT

A dual purge ejector and a dual purge system using the same are provided. A first end of a main body is fully open and an ejecting end of a nozzle is located proximate to the opening hole. Therefore, even if the ejector is disconnected from an adapter, negative pressure is not formed in a main body, to prevent discharge of fuel evaporation gas into the atmosphere and a failure of the dual purge system may be reliably diagnosed.

9 Claims, 5 Drawing Sheets

DUAL PURGE EJECTOR AND DUAL PURGE SYSTEM USING THE SAME

CROSS-REFERENCE TO RELATED APPLICATION

This application claims under 35 U.S.C. § 119(a) the benefit of priority to Korean Patent Application No. 10-2020-0072303 filed on Jun. 15, 2020, the entire contents of which are incorporated herein by reference.

TECHNICAL FIELD

The present invention relates to a dual purge ejector, and more particularly, to a dual purge ejector that allows purge of fuel evaporation gas in a canister even when a turbocharger operates.

BACKGROUND ART

Fuel evaporation gas in a fuel tank has a component of hydrocarbon and is a harmful emission substance that, along with nitrogen oxide, causes photochemical smog to adversely affect the human body and nature. Therefore, to prevent a direct discharge into the atmosphere, the fuel evaporation gas is collected in a canister, and then, suctioned into an engine by negative pressure of an intake manifold to be combusted. However, in a vehicle mounted with a turbocharger, positive pressure is formed in the intake manifold when the turbocharger operates, and thus, the fuel evaporation gas may not be suctioned into the intake manifold and normal treatment of the fuel evaporation gas becomes impossible.

Therefore, an ejector is installed in a pipe connecting a front end of the turbocharger and a front end of the intake manifold, compressed air is supplied to the ejector, and the ejector is connected to a purge control solenoid valve (PCSV), and thus, the fuel evaporation gas is suctioned into the front end of the turbocharger through the ejector and is supplied to the engine to be combusted when the turbocharger operates. When the turbocharger does not operate, the fuel evaporation gas is directly suctioned into the front end of the intake manifold from the PCSV.

As described above, a dual purge system is provided to allow the fuel evaporation gas to flow into the engine through two paths based on whether the turbocharger operates, and the ejector used in this system is referred to as a 'dual purge ejector', which hereinafter will be referred to as an "ejector" in the present specification for the sake of convenience.

As shown in FIG. 1, the ejector includes a nozzle unit 1, a cover unit 2, and a diffuser unit 3. A nozzle 1a through which compressed air flows in is integrally formed on one side of the nozzle unit 1. The cover unit 2 formed as a separate unit is mounted on top of the nozzle unit 1, and a fuel evaporation gas inlet pipe 2a is integrally formed in the cover unit 2. The diffuser unit 3 formed as a separate unit is mounted in a portion across from the nozzle 1a of the nozzle unit 1. The cover unit 2 and the diffuser unit 3 are laser-welded to the nozzle unit 1 to be integrated into an inseparable state from each other.

The diffuser unit 3 is connected to an adapter 4 to be installed at the front of the turbocharger in an intake line. The diffuser unit 3 is inserted into an insertion hole 4a formed in the adapter 4 and a mounting flange 3a formed on one side of the diffuser unit 3 is fixed to the peripheral portion of the insertion hole 4a with a bolt 5.

When the turbocharger operates, high pressure at the front end of the intake manifold is introduced into the nozzle 1a through a connecting hose. As compressed air is discharged through the nozzle 1a at high speed, the pressure is reduced to form negative pressure (negative pressure) in the inner space (mixing chamber) of the nozzle unit 1, and then, the air is diffused through the diffuser unit 3 to be discharged smoothly into the inside of the adapter 4. With the formation of the negative pressure in the nozzle unit 1 as described above, the fuel evaporation gas is suctioned through the fuel evaporation gas inlet pipe 2a to be discharged into the adapter 4 along with air. Therefore, the canister may be normally purged even when the turbocharger operates.

In addition, a pressure sensor configured to measure the internal pressure of the nozzle unit 1, that is, the pressure of the mixing chamber, is installed on the outer side of the nozzle unit 1, which is not shown in the drawing. The measured value of the pressure sensor is transmitted to an engine control unit (ECU) and used in determining whether the dual purge system has a failure. In other words, the engine control unit diagnoses the dual purge system as having a failure if negative pressure sufficient to allow normal suction of the fuel evaporation gas is not formed.

Meanwhile, the ejector may be disconnected from the adapter 4 as shown in FIG. 2 caused by loosening of the bolt 5 or damage to the mounting flange 3a. However, despite the ejector being disconnected from the adapter 4, since the diffuser unit 3 is coupled to the nozzle unit 1 (the nozzle unit 1 and the diffuser unit 3 are laser-welded with each other), negative pressure is normally formed in the mixing chamber in the nozzle unit 1.

Therefore, fuel evaporation gas may still be suctioned into the ejector and there was a problem that the fuel evaporation gas suctioned into the ejector could not be supplied to the intake manifold and was discharged into the atmosphere. In addition, there was a problem that, as negative pressure was normally formed in the nozzle unit 1, the engine control unit to which the measured value of the pressure sensor was transmitted determined a normal state and did not diagnose a failure even when fuel evaporation gas was not actually sucked into the engine. Therefore, there was a problem that a driver, unaware of the problem in the dual purge system, did not take a measure and that the fuel evaporation gas continued to be discharged into the atmosphere.

SUMMARY

The present invention provides a dual purge ejector configured to prevent discharge of fuel evaporation gas into the atmosphere when the ejector is disconnected from an adapter. In addition, the present invention provides a dual purge system configured to diagnose a failure of the dual purge system when the ejector is disconnected from the adapter.

A dual purge ejector according to the present invention for achieving the above objects may include a nozzle unit including a main body and a nozzle formed on a first side of the main body to eject compressed air into the main body; and a cover unit mounted on a first side of an outer circumference of the main body to form a path through which fuel evaporation gas flows into the main body, wherein an entire end of the main body on a second side is open so that an opening hole is formed and an end of the nozzle ejecting compressed air is located proximate to the opening hole.

In the main body, a cover coupling part, connected to an inner space of the main body and a communication path, is formed on a first side of an outer circumferential surface, the nozzle being formed on the first side, and the cover unit is coupled to the cover coupling part. An adapter to which the main body is coupled is further included, a mounting boss is formed to protrude from the adapter, and an insertion hole through which the end of the main body on the opening hole side is inserted into the mounting boss and a diffuser hole through which the insertion hole communicates with the inner space of the adapter are formed.

The diffuser hole may include a reduced diameter part connected to the insertion hole, an enlarged diameter part connected to the inner space of the adapter, and a throat part between the reduced diameter part and the enlarged diameter part. The diffuser hole may include a reduced diameter part connected to the insertion hole and a throat part formed to communicate with the inner space of the adapter while maintaining the same diameter onward from an end of the reduced diameter part on the small diameter part side.

A mounting flange is formed on an outer circumferential surface of the main body, a coupling hole is formed in the mounting boss, and a bolt inserted through a through hole of the mounting flange is fastened to the coupling hole. A bushing is installed in the through hole of the mounting flange and the bolt passes through the bushing. A nut member is installed in the coupling hole and the bolt is fastened to the nut member.

In addition, a dual purge system according to the present invention may include the dual purge ejector, wherein a sensor coupling part is formed on a first side of the outer circumferential surface of the main body, a pressure sensor configured to measure the pressure of the inner space of the main body is installed in the sensor coupling part, the pressure sensor is configured to transmit measured values to an engine control unit, and the engine control unit is configured to diagnose the dual purge system as having a failure if negative pressure is not formed in the inner space of the main body in a state where a turbocharger operates.

According to the present invention as described above, negative pressure is not generated in an ejector when the ejector is disconnected from an adapter, and thus, discharge of fuel evaporation gas to the atmosphere is prevented. In addition, there is an effect of allowing the engine control unit to swiftly and more accurately determine a failure of the dual purge system for the same reason. The diffuser unit which was manufactured as a separate unit is formed in the adapter, and thus, the number of parts of the ejector is reduced to reduce the assembly man-hours and cut down the manufacturing cost.

BRIEF DESCRIPTION OF DRAWINGS

The objects, features and advantages of the present disclosure will be more apparent from the following detailed description in conjunction with the accompanying drawings, in which.

DETAILED DESCRIPTION

Figure 1:
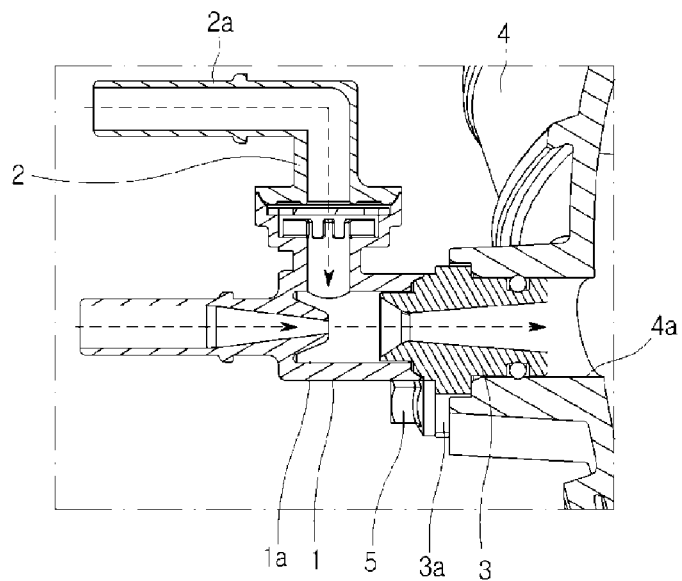
FIG. 1 is a cross-sectional view of a dual purge ejector according to the related art in an assembled state.
Figure 2:
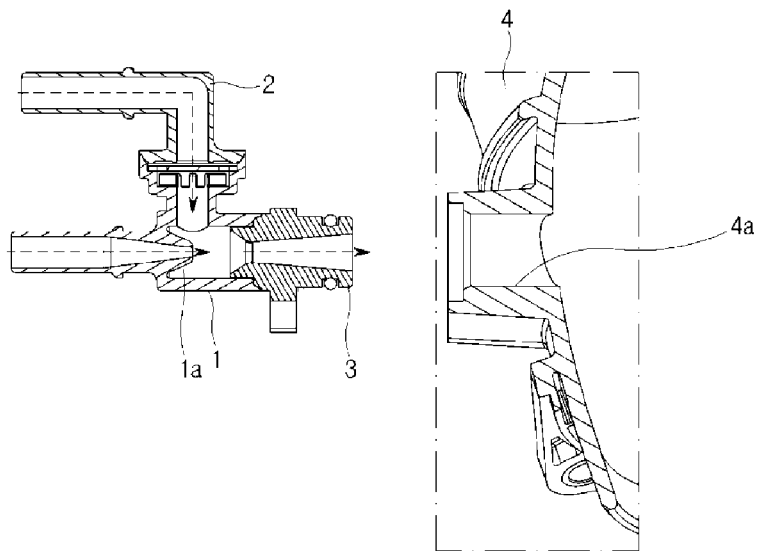
FIG. 2 is a view of the ejector of FIG. 1 in a disconnected state.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention may be subjected to various modifications and may have several embodiments, and specific embodiments will be illustrated in the drawings and described in detail. However, this does not intend to limit the present invention to the specific embodiments and should be understood to include all modifications, equivalents, or substitutes included in the spirit and technical scope of the present invention. The thickness of lines or the size of parts illustrated in the accompanying drawings may be exaggerated for clarity or convenience of description.

In addition, the terms to be described below are terms defined in consideration of functions in the present invention and may be subjected to variations according to the intentions or precedents of users and operators. Therefore, these terms should be defined based on the content of the present specification as a whole. Hereinafter, exemplary embodiments according to the present invention will be described in detail with reference to the accompanying drawings.

Figure 3:
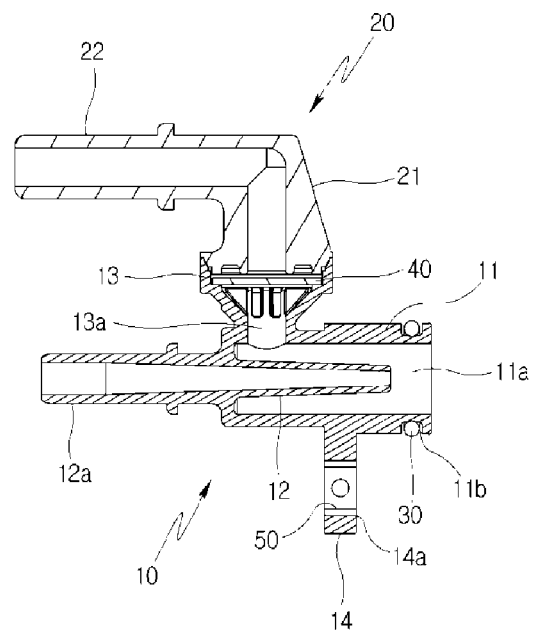
FIG. 3 is a cross-sectional view of a dual purge ejector according to the present invention.
Figure 4:
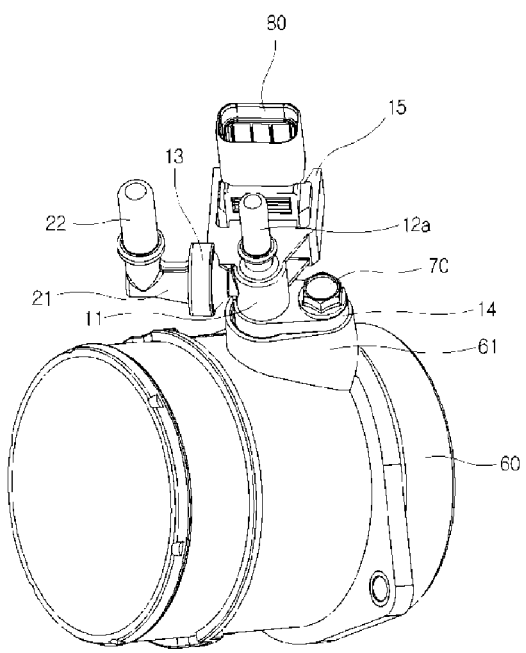
FIG. 4 is a perspective view of a dual purge ejector according to the present invention in an assembled state.
Figure 5:
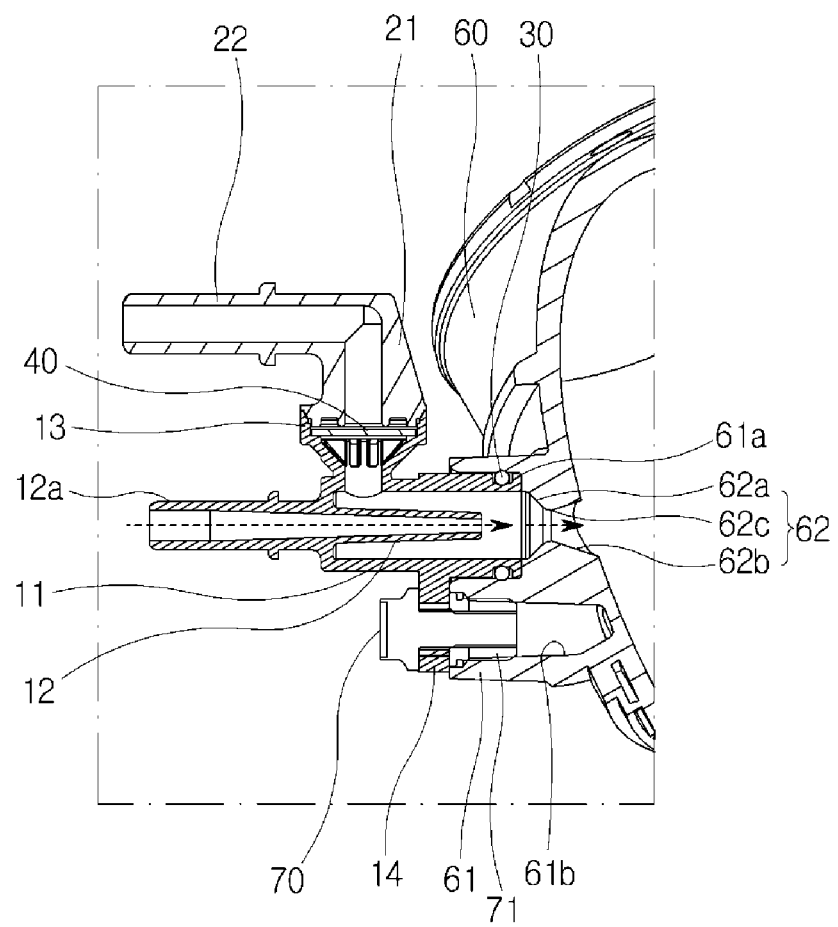
FIG. 5 is a cross-sectional view of a dual purge ejector according to the present invention in an assembled state.

As shown in FIGS. 3 to 5, a dual purge ejector according to the present invention includes a nozzle unit 10 and a cover unit 20. The nozzle unit 10 may include a cylindrical main body 11, a nozzle 12 formed and structured to pass through a first side of the main body 11, and a cover coupling part 13 formed on the outer circumferential surface on the first side of the main body 11 where the nozzle 12 is formed to pass through.

The main body 11 has a cylindrical shape, one side of which the nozzle 12 is formed to pass through. An opening hole 11a having the same diameter as the inner diameter of the main body 11 is formed in a portion of the main body 11 across from the side where the nozzle 12 is formed. In other words, the opening hole 11a is formed by a second end of the main body 11 being fully open. In addition, the inner circumferential surface of the main body 11 as well as the portion thereof where the opening hole 11a is formed, is formed to be a smooth surface having the same inner diameter throughout without a portion protruding inward in the radial direction.

The nozzle 12 is formed to protrude long toward the opening hole 11a, so that the end through which the compressed air is ejected is located proximate to the opening hole 11a. Therefore, the compressed air discharged from the nozzle 12 at high speed is discharged to the outside of the main body 11 as it is without affecting the pressure in the inner space of the main body 11.

The nozzle 12 is formed long (lengthwise) as described above to prevent the formation of negative pressure in the main body 11 caused by the ejection of compressed air, and thus, the nozzle 12 may be formed such that the compression air ejection end of the nozzle is at the same position as the opening hole 11a or may be formed to be long enough to protrude to the outside of the main body 11. The other end of the nozzle 12, that is, an inlet part of the nozzle 12, may be formed as a circular connecting pipe 12a and a pipe conduit (a hose or a pipe) connected to the intake manifold front end is connected to the connecting pipe 12a.

The cover unit 20 may have an approximate 'L' shape and may include a body 21 coupled to the cover coupling part 13 and a connecting pipe 22 which is bent to extend from the body 21 and connected to the PCSV and the pipe conduit. The cover coupling part 13 and the body 21 of the cover unit 20 are formed in a cylindrical shape and the body 21 of the cover unit 20 is inserted into, and coupled to, the cover coupling part 13. Therefore, it is possible to rotate the cover unit 20 with respect to the cover coupling part 13 and adjust the direction of the connecting pipe 22 of the cover unit 20 in an appropriate direction. The cover coupling part 13 and the body 21 are laser-welded to be completely fixed to each other after the direction of the connecting pipe 22 is adjusted.

Fuel evaporation gas flows from the PCSV into the connecting pipe 22 and the cover coupling part 13 is connected to the inner space of the main body 11 through the communication path 13a formed in the main body 11. Therefore, the fuel evaporation gas may flow into the main body 11. A disc-shaped check valve 40 is installed between the cover coupling part 13 and the body 21 of the cover unit 20. The check valve 40 is of a normal open type and allows the fuel evaporation gas flowing in through the connecting pipe 22 to move toward the main body 11, blocking the reverse flow, that is, the movement of the air in the main body 11 toward the cover unit 20.

An O-ring groove 11b is formed along the circumference on the outer circumferential surface of the main body 11 on the side of the opening hole 11a and an O-ring 30 is installed in the O-ring groove 11b. A mounting flange 14 is formed to protrude outward in the radial direction on one side of the outer circumferential surface in the middle portion of the main body 11 in the longitudinal direction. The mounting flange 14 is a flat plate that forms a right angle to the main body 11 and includes a through hole 14a, and a metal bushing 50 is inserted into the through hole 14a. The bushing 50 is inserted at the time of injection molding of the nozzle unit 10.

Meanwhile, an adapter 60 for mounting an ejector is installed in the intake line of the turbocharger front end. The adapter 60 has a cylindrical shape and may be installed in the middle portion of an intake pipe or a connecting portion of the intake pipe and the air cleaner. A mounting boss 61 for mounting the ejector is formed to protrude on the outer circumferential surface of the adapter 60. The upper surface of the mounting boss 61 is formed in the same shape as the mounting flange 14 of the main body 11, so that the mounting flange 14 and the mounting boss 61 may be disposed against each other. An insertion hole 61a into which the main body 11 is inserted and a coupling hole 61b for coupling the mounting flange 14 with a bolt 70 are formed in the mounting boss 61. The insertion hole 61a communicates with the inner space of the adapter 60 through a diffuser hole 62 formed in the base end of the mounting boss 61.

The diffuser hole 62 includes a reduced diameter part 62a formed on the side of the insertion hole 61a and an enlarged diameter part 62b connected to the reduced diameter part 62a and formed on the inner space side of the adapter 60. The reduced diameter part 62a is shaped to have an inner diameter gradually decreasing in the air discharge direction and the enlarged diameter part 62b is shaped to have an inner diameter that gradually increases in the air discharge direction. A throat part 62c at which the inner diameter is minimized is present between the reduced diameter part 62a and the enlarged diameter part 62b.

Figure 7:
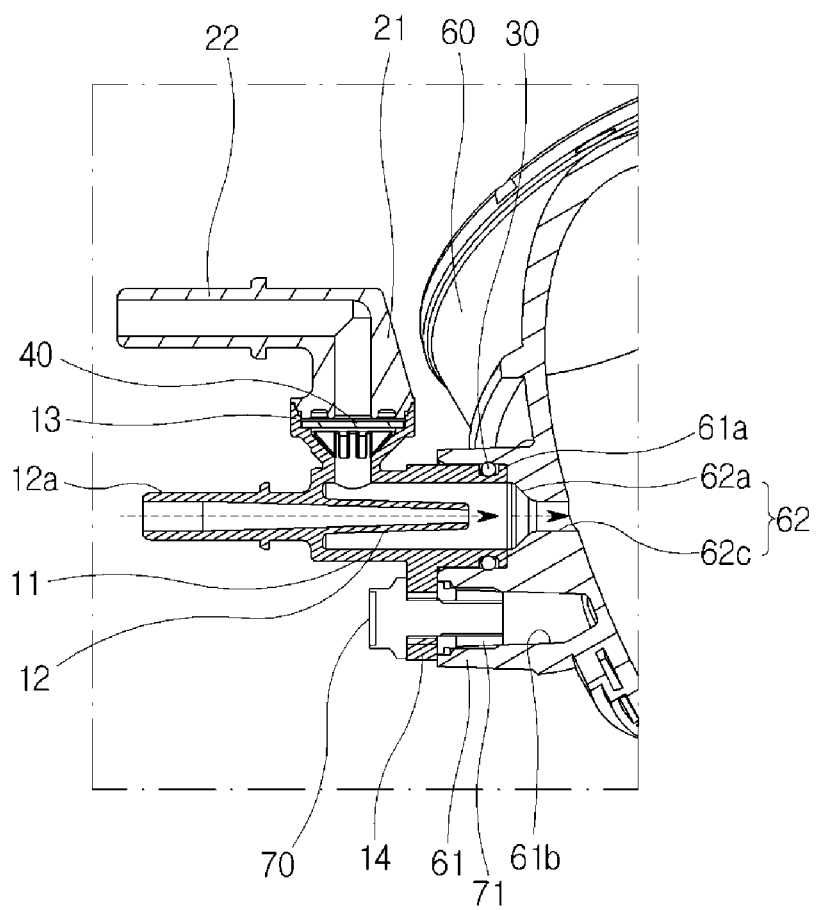
FIG. 7 is a view corresponding to FIG. 5 and showing another embodiment of a diffuser hole formed in an adapter.

Meanwhile, as shown in FIG. 7, the diffuser hole 62 may be formed of the reduced diameter part 62a and the throat part 62c only. In other words, in the diffuser hole 62 of FIG. 5, the throat part 62c communicates with the inner space of the adapter 60 while maintaining the same diameter and the enlarged diameter part 62b is not formed. The structure with no enlarged diameter part 62b as described above may be used when an undercut occurs in the portion where the enlarged diameter part 62b is to be formed in the molding structure for manufacturing the adapter 60. Although the enlarged diameter part 62b is not present, the distance between the end of the nozzle 12 and the diffuser hole 62 is short due to the proximity of the end of the nozzle 12 to the opening hole 11a, and thus, the compressed air discharged from the nozzle 12 at high speed and the fuel evaporation gas mixed therewith may be discharged into the adapter 60 more smoothly.

When the main body 11 is inserted into the insertion hole 61a, the O-ring 30 is in close contact with the inner circumferential surface of the insertion hole 61a to seal the gap between the main body 11 and the insertion hole 61a. A nut member 71 is inserted into the inner circumferential surface of the coupling hole 61b, and the bolt 70 inserted through the bushing 50 of the mounting flange 14 is fastened to the nut member 71, to thus fix the mounting flange 14 to the mounting boss 61.

Meanwhile, a sensor coupling part 15, in which a pair of snap-fit fastening pieces are formed, is formed on one side of the outer circumferential portion of the main body 11 and a pressure sensor 80 is installed in the sensor coupling part 15 (refer to FIG. 4). The internal pressure of the main body 11 is transmitted to the pressure sensor 80 through a pressure drain hole formed through the lower portion of the sensor coupling part 15 and the main body 11 and thus, the internal pressure of the main body 11 may be measured and the measured value of the pressure sensor 80 may be transmitted to an engine control unit (ECU) to be used in determining by the engine control unit whether the dual purge system has a failure.

Hereinafter, the operational effects of the present invention will be described. When the turbocharger operates in an assembled state as shown in FIG. 5, compressed air at the front end of the intake manifold flows into the connecting pipe 12a of the nozzle unit 10.

The compressed air is ejected at high speed through the nozzle 12 to decrease the pressure to thus discharge the compressed air through the diffuser hole 62 while the surrounding air is suctioned, whereby negative pressure is formed in the main body 11. Therefore, the fuel evaporation gas is suctioned from the PCSV into the main body 11 through the connecting pipe 22 of the cover unit 20 (e.g., the check valve 40 is in an open state) and discharged through the diffuser hole 62 together with the air ejected from the nozzle 12.

Figure 6:
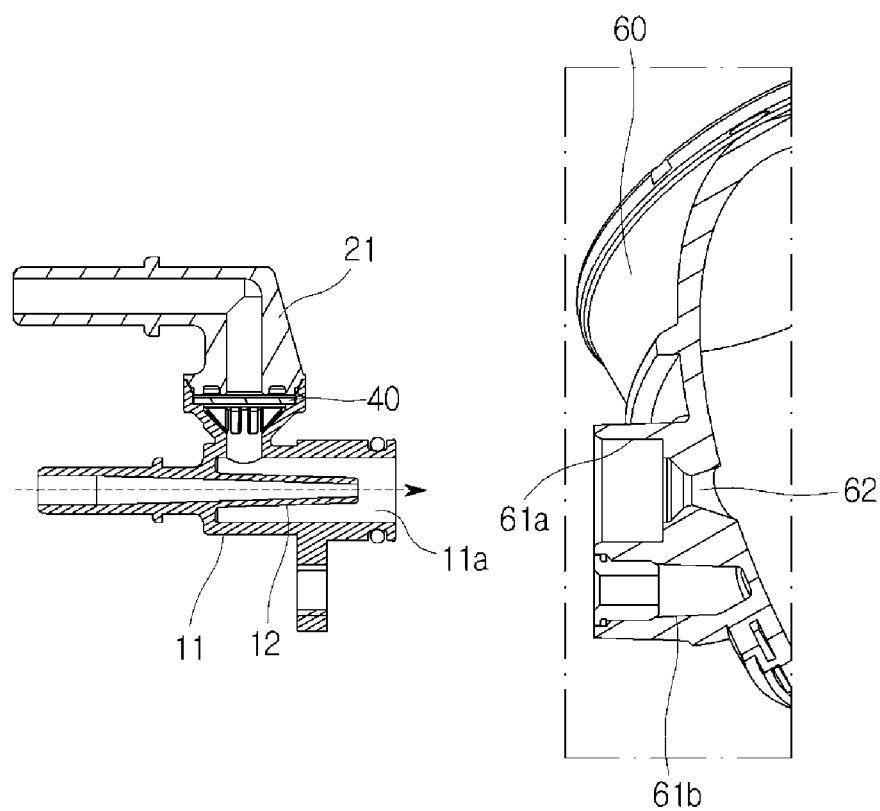
FIG. 6 is a view of the ejector of FIG. 5 in a disconnected state.

As the air mixed with the fuel evaporation gas passes through the throat part 62c and is diffused through the enlarged diameter part 62b thereafter, the flow rate decreases and the pressure is restored to a positive pressure state, and thus, the mixed air may be smoothly blended in the flow of new air passing through the adapter 60. Now, a case where the ejector is disconnected from the adapter 60 as shown in FIG. 6 will be described.

In the ejector according to the present invention, the length of the nozzle 12 is extended, and thus, the end of the nozzle 12 is proximate to the opening hole 11a of the main body 11. In addition, in the main body 11 of the ejector disconnected from the adapter 60, there does not exist a part, like the reduced diameter part 62a of the diffuser hole 62, that blocks the opening hole 11a to separate the inner space of the main body 11 from the atmospheric space. Therefore, even if the air is discharged from the nozzle 12 at high speed, it may be immediately diffused into the atmosphere upon being discharged. In other words, even if low pressure is locally formed near the end of the nozzle 12, a substantially amount of air flows in from the atmosphere to be mixed to prevent the air in the main body 11 from moving to the lower pressure portion, and consequently, negative pressure is not formed in the main body 11.

Therefore, no suction force is generated in the connecting pipe 22 of the cover unit 20, thus preventing the fuel evaporation gas from flowing from the PCSV into the main body 11. Therefore, even if the ejector is disconnected from the adapter 60, a phenomenon of the fuel evaporation gas being directly discharged into the atmosphere is prevented. Meanwhile, the engine control unit (ECU) may be configured to constantly check the pressure state in the main body 11 using the pressure sensor 80. Therefore, the engine control unit may be configured to determine, from the measured value of the pressure sensor 80, whether negative pressure is normally formed in the main body 11 in a state where the turbocharger operates.

Therefore, if the ejector is disconnected from the adapter 60 as described above and the negative pressure state of the main body 11 is not detected, the engine control unit may be configured to determine a state in which normal purge of the fuel evaporation gas is impossible, that is, an occurrence of a failure in the dual purge system. Such a diagnostic result may be displayed, for example, by blinking of a warning light provided on an instrument panel, and the driver may see the warning light and thus be aware of an abnormality in the dual purge system and have the dual purge system checked and fixed. In addition, according to the present invention, a diffuser shape is formed in the adapter 60, so that there is no need to separately manufacture the diffuser unit (reference numeral 3 in FIG. 1 of the related art) and assemble the same in the nozzle unit. Therefore, the number of parts and assembly man-hours of the ejector are reduced and manufacturing cost is cut down.

As described above, the present invention is described with reference to the exemplary embodiments illustrated in the drawings, but this is just exemplary, and those with ordinary skill in the field to which the technology pertains will understand that various modifications and equivalent other embodiments are possible from this. Therefore, the true technical protection scope of the present invention shall be determined by the following patent claims.

DESCRIPTION OF REFERENCE NUMERALS

10: nozzle unit
11: main body
11a: opening hole
11b: O-ring groove
12: nozzle
12a: connecting pipe
13: cover coupling part
13a: communication path
14: mounting flange
14a: through hole
15: sensor coupling part
20: cover unit
21: body
22: connecting pipe
30: O-ring
40: check valve
50: bushing
60: adapter
61: mounting boss
61a: insertion hole
61b: coupling hole
62: diffuser hole
62a: reduced diameter part
62b: enlarged diameter part
62c: throat part
70: bolt
80: pressure sensor

What is claimed is:

1. A dual purge ejector, comprising:
   a nozzle unit including a main body and a nozzle formed on a first side of the main body to eject compressed air into the main body;
   a cover unit mounted on a first side of an outer circumference of the main body to form a path through which fuel evaporation gas flows into the main body; and
   an adapter to which the main body is coupled,
   wherein an entire end of the main body on a second side is open to form an opening hole, and
   wherein an end of the nozzle ejecting compressed air is located proximate to the opening hole,
   wherein a mounting boss if formed to protrude from the adapter, and an insertion hole through which an end of the main body on the opening hole side is inserted to the mounting boss and a diffuser hold through which the insertion hole communicates with the inner space of the adapter are formed.

2. The dual purge ejector according to claim 1, wherein, in the main body, a cover coupling part connected to an inner space of the main body and a communication path is formed on the first side of an outer circumferential surface, the nozzle being formed on the first side, and the cover unit is coupled to the cover coupling part.

3. The dual purge ejector according to claim 1, wherein the diffuser hole includes a reduced diameter part connected to the insertion hole, an enlarged diameter part connected to the inner space of the adapter, and a throat part between the reduced diameter part and the enlarged diameter part.

4. The dual purge ejector according to claim 1, wherein the diffuser hole includes a reduced diameter part connected to the insertion hole and a throat part formed to communicate with the inner space of the adapter while maintaining a same diameter onward from an end of the reduced diameter part on the small diameter part side.

5. The dual purge ejector according to claim 1, wherein a mounting flange is formed on an outer circumferential surface of the main body, a coupling hole is formed on the mounting boss, and a bolt inserted through a through hole of the mounting flange is fastened to the coupling hole.

6. The dual purge ejector according to claim 5, wherein a bushing is installed in the through hole of the mounting flange and the bolt passes through the bushing.

7. The dual purge ejector according to claim 5, wherein a nut member is installed in the coupling hole and the bolt is fastened to the nut member.

8. A dual purge system comprising the dual purge ejector of claim 1, wherein a sensor coupling part is formed on one side of the outer circumferential surface of the main body, wherein a pressure sensor configured to measure the pressure of the inner space of the main body is installed in the sensor coupling part, wherein the pressure sensor is configured to transmit measured values to an engine control unit, and wherein the engine control unit is configured to diagnose the dual purge system as having a failure if negative pressure is not formed in the inner space of the main body in a state where a turbocharger operates.

9. A dual purge system comprising the dual purge ejector, the dual purge ejector, comprising:

a nozzle unit including a main body and a nozzle formed on a first side of the main body to eject compressed air into the main body;

a cover unit mounted on a first side of an outer circumference of the main body to form a path through which fuel evaporation gas flows into the main body; and wherein an entire end of the main body on a second side is open to form an opening hole, and wherein an end of the nozzle ejecting compressed air is located proximate to the opening hole;

wherein a sensor coupling part is formed on one side of the outer circumferential surface of the main body, wherein a pressure sensor configured to measure the pressure of the inner space of the main body is installed in the sensor coupling part, wherein the pressure sensor is configured to transmit measured values to an engine control unit, and wherein the engine control unit is configured to diagnose the dual purge system as having a failure if negative pressure is not formed in the inner space of the main body in a state where a turbocharger operates.

* * * * *